(12) United States Patent
Raje

(10) Patent No.: US 7,961,115 B2
(45) Date of Patent: Jun. 14, 2011

(54) SYSTEM FOR DISPLAYING REQUIRED NAVIGATION PERFORMANCE ON A HORIZONTAL SITUATION INDICATOR

(75) Inventor: Anup Raje, Karnataka (IN)

(73) Assignee: Honeywell International Inc., Morristown, NJ (US)

(*) Notice: Subject to any disclaimer, the term of this patent is extended or adjusted under 35 U.S.C. 154(b) by 415 days.

(21) Appl. No.: 12/142,531

(22) Filed: Jun. 19, 2008

(65) Prior Publication Data

US 2009/0315739 A1 Dec. 24, 2009

(51) Int. Cl.
*G01C 21/00* (2006.01)

(52) U.S. Cl. ........ 340/979; 340/972; 340/975; 340/980; 340/995.17; 340/945; 340/963; 340/973; 340/970; 340/425.5; 340/439; 701/13; 701/14; 701/208; 701/209; 701/210

(58) Field of Classification Search .................. 340/979, 340/972, 975, 980, 995, 945, 963, 973, 970, 340/425.5, 439; 701/13, 14, 208, 209, 210
See application file for complete search history.

(56) References Cited

U.S. PATENT DOCUMENTS

| 5,359,890 | A | * | 11/1994 | Fulton et al. ............... 73/178 R |
| 5,412,382 | A | * | 5/1995 | Leard et al. ................. 340/974 |
| 6,111,525 | A | * | 8/2000 | Berlioz et al. .............. 340/971 |
| 6,571,155 | B2 | | 5/2003 | Carriker et al. |
| 6,868,320 | B1 | | 3/2005 | Burch |
| 6,885,313 | B2 | | 4/2005 | Selk, II et al. |
| 7,046,170 | B2 | | 5/2006 | Naimer et al. |
| 7,237,747 | B1 | | 7/2007 | Baudry |
| 2003/0034901 | A1 | * | 2/2003 | Griffin, III ................. 340/945 |
| 2003/0193410 | A1 | * | 10/2003 | Chen et al. ................. 340/971 |
| 2004/0189492 | A1 | | 9/2004 | Selk, II et al. |
| 2006/0161336 | A1 | | 7/2006 | Wischmeyer |

FOREIGN PATENT DOCUMENTS

WO 2006136687 A2 12/2006

OTHER PUBLICATIONS

European Search Report dated Jun. 7, 2010, for Application No. 09162733.

* cited by examiner

*Primary Examiner* — Tai T Nguyen
(74) *Attorney, Agent, or Firm* — Ingrassia Fisher & Lorenz, P.C.

(57) ABSTRACT

A display system is provided that renders a horizontal situation indicator that includes required navigation performance (RNP) and estimated position uncertainty (EPU) values rendered non-numerically and in a fairly intuitive manner. A processor receives at least data representative of a desired course of the aircraft, data representative of the RNP for the aircraft, and data representative of the EPU for the aircraft. The processor renders, on a display device, a horizontal situation indicator that includes an aircraft symbol representative of a top-down view of the aircraft, an RNP boundary graphic representative of at least one RNP boundary for the aircraft, and an EPU graphic representative of the EPU for the aircraft. The aircraft symbol is rendered at a position that is representative of actual aircraft position relative to the desired course, and the RNP boundary graphic is rendered at a position relative to the rendered aircraft symbol.

8 Claims, 4 Drawing Sheets

SYSTEM FOR DISPLAYING REQUIRED NAVIGATION PERFORMANCE ON A HORIZONTAL SITUATION INDICATOR

TECHNICAL FIELD

The present invention generally relates to avionic displays and, more particularly, to a system for displaying required navigation performance and estimated position uncertainty on, for example, a horizontal situation indicator.

BACKGROUND

Commercial aviation regulatory agencies have developed required navigation performance (RNP) protocols to facilitate the management of air traffic. Required navigation performance equipped aircraft can safely operate along various routes with less separation than previously needed. This can be significant because less separation means that the number of aircraft that can safely use a particular airspace may increase, and therefore accommodate the increasing demand for air traffic capacity. Under these protocols, RNP values may be assigned to various segments, or legs, of an aircraft's flight plan. For example, during approach an aircraft is typically assigned an RNP value of 0.3 nautical miles (nm). Moreover, for enroute portions of a flight aircraft are typically assigned an RNP value of 2.0 nm, for terminal portions the assigned RNP value is typically 1.0 nm, and when flying over the ocean the RNP value is typically 4.0 or 10.0 nm.

The RNP value defines an airspace within which the aircraft should remain for a predetermined percentage (e.g., 95 percent) of the total flying time. This airspace may be referred to as the RNP Obstacle Evaluation Area or, more simply, the RNP corridor. If the aircraft is RNP capable and if the pilot is appropriately certified, the pilot may attempt to travel the assigned landing leg while remaining within the RNP corridor. If, during the landing attempt, the aircraft breaches an RNP boundary and the leaves the corridor, a warning indicator (e.g., a hazard light) is produced inside the aircraft's cabin and the landing may be aborted and attempted again at a later time.

Closely related to RNP, is what is known as the estimated position uncertainty (EPU). The EPU is basically the value of the total error of the aircraft navigation system. It may thus be appreciated that as long as the EPU is less than the current RNP value for the present airspace, then the aircraft can continue operating in the assigned RNP corridor.

Many conventional aircraft display systems include various means for displaying current RNP and EPU values to a flight crew. These display systems include implementations for displaying the current RNP and EPU values both numerically and non-numerically. For example, many displays, such as the horizontal situation indicator (HSI), display the RNP and EPU values numerically, and some attitude display indicators (ADI) display the RNP and EPU values graphically. In both instances, the RNP and EPU values may not be displayed to the flight crew in a highly intuitive manner.

Hence, it would be desirable to provide a horizontal situation indicator that displays RNP and EPU values non-numerically and in a fairly intuitive manner. The present invention addresses at least this need.

BRIEF SUMMARY

In one embodiment, and by way of example only, an aircraft display system includes a display device and a processor. The processor is in operable communication with the display device and is adapted to receive at least data representative of a desired course of the aircraft, data representative of required navigation performance (RNP) for the aircraft, and data representative of estimated position uncertainty (EPU) for the aircraft. The processor is configured, in response to at least these data, to render a horizontal situation indicator on the display device that includes an aircraft symbol representative of a top-down view of the aircraft, an RNP boundary graphic representative of at least one RNP boundary for the aircraft, and an EPU graphic representative of the EPU for the aircraft. The aircraft symbol is rendered at a position that is representative of actual aircraft position relative to the desired course, and the RNP boundary graphic is rendered at a position relative to the rendered aircraft symbol.

In another exemplary embodiment, an aircraft display system includes a display device and a processor. The processor is in operable communication with the display device and is adapted to receive at least data representative of a desired course of the aircraft, data representative of required navigation performance (RNP) for the aircraft, and data representative of estimated position uncertainty (EPU) for the aircraft. The processor is configured, in response to at least these data, to determine a lateral deviation distance of the aircraft from a desired course and to render a horizontal situation indicator on the display device that includes an aircraft symbol representative of a top-down view of the aircraft, an RNP boundary graphic representative of at least one RNP boundary for the aircraft, an EPU graphic representative of the EPU for the aircraft, and a corrective graphic on the display device if the lateral deviation distance is greater than a first predetermined lateral deviation distance. The aircraft symbol is rendered at a position that is representative of actual aircraft position relative to the desired course. The RNP boundary graphic is rendered at a position relative to the rendered aircraft symbol. The EPU graphic comprises a pair of line segments separated from each other by a separation distance that is proportional to the EPU for the aircraft.

Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
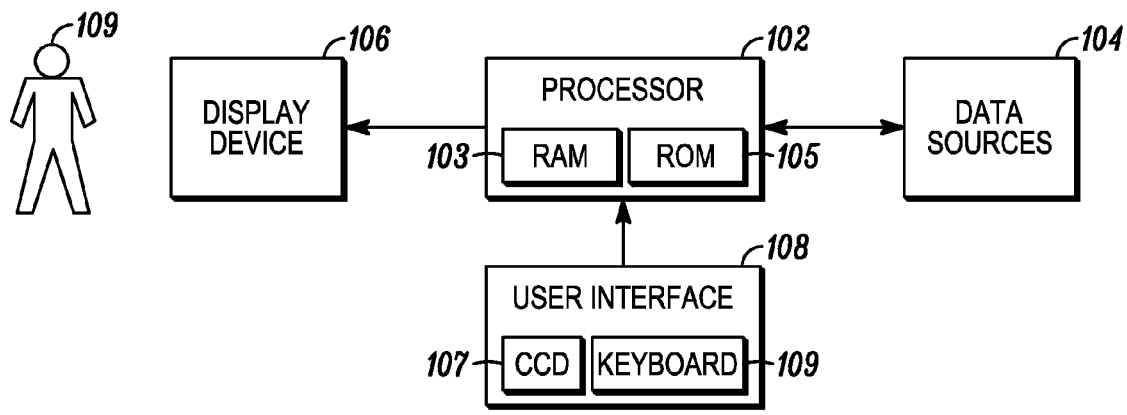
FIG. 1 is a block diagram of an exemplary embodiment of an avionics display system.

A functional block diagram of an exemplary avionics display system 100 is depicted in FIG. 1, and includes a processor 102, a plurality of data sources 104, and a display device 106. The processor 102 is in operable communication with the data sources 104 and the display device 106. The processor 102 is coupled to receive various types of aircraft data from the data sources 104. It will be appreciated that the aircraft data may vary, but in the depicted embodiment the data includes at least various aircraft navigation data, data representative of required navigation performance (RNP) for the aircraft, and data representative of estimated position uncertainty (EPU) for the aircraft. The processor 102 is configured, in response to at least these data, to render a horizontal situation indicator on the display device 106.

The processor 102 may be any one (or a plurality) of numerous known general-purpose microprocessors or application specific processor(s) that operates in response to program instructions. In the depicted embodiment, the processor 102 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 102 may be implemented using various other circuits, not just a programmable processor. For example, digital logic circuits and analog signal processing circuits could also be used. In this respect, the processor 102 may include or cooperate with any number of software programs (e.g., avionics display programs) or instructions designed to carry out various methods, process tasks, calculations, and control/display functions described below.

The data sources 104 supply the above-mentioned aircraft data to the processor 102. The data sources 104 may include a wide variety of informational systems, which may reside onboard the aircraft or at a remote location. By way of example, the data sources 104 may include one or more of a runaway awareness and advisory system, an instrument landing system, a flight director system, a weather data system, a terrain avoidance and warning system, a traffic and collision avoidance system, a terrain database, an initial reference system, a navigational database, and a flight management system. The data sources 104 may also include mode, position, and/or detection elements (e.g., gyroscopes, global positioning systems, inertial reference systems, etc.) capable of determining the mode and/or position of the aircraft relative to one or more reference locations, points, planes, or navigation aids.

As FIG. 1 additionally depicts, the system 100 may also include a user interface 108. The user interface 108, if included, is in operable communication with the processor 102 and is configured to receive input from a user 109 (e.g., a pilot) and, in response to the user input, supply command signals to the processor 102. The user interface 108 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display device, and may use the keyboard 111 to, among other things, input textual data.

The display device 106 is used to display various images and data, in a graphic, iconic, and a textual format, and to supply visual feedback to the user 109. It will be appreciated that the display device 106 may be implemented using any one of numerous known displays suitable for rendering graphic, iconic, and/or text data in a format viewable by the user 109. Non-limiting examples of such displays include various cathode ray tube (CRT) displays, and various flat panel displays, such as various types of LCD (liquid crystal display) and TFT (thin film transistor) displays. The display may additionally be based on a panel mounted display, a HUD projection, or any known technology. In an exemplary embodiment, display device 106 includes a panel display. It is further noted that the system 100 could be implemented with more than one display device 106. For example, the system 100 could be implemented with two or more display devices 106.

No matter the number or particular type of display that is used to implement the display device 106, it was noted above that the processor 102 is responsive to the various data it receives to render a horizontal situation indicator on the display device 106. A portion of an exemplary horizontal situation indicator that may be rendered on the display device 106 is depicted is FIG. 2 and will now be described. Before doing so, it is noted that the depicted horizontal situation indicator 200 is merely exemplary of one embodiment, and that it could be variously implemented. It is additionally noted that not all of the rendered images that are depicted in FIG. 2 will be described, and that various other images that are not depicted in FIG. 2 (or further described) could be rendered on the horizontal situation indicator 200, if needed or desired.

Figure 2:
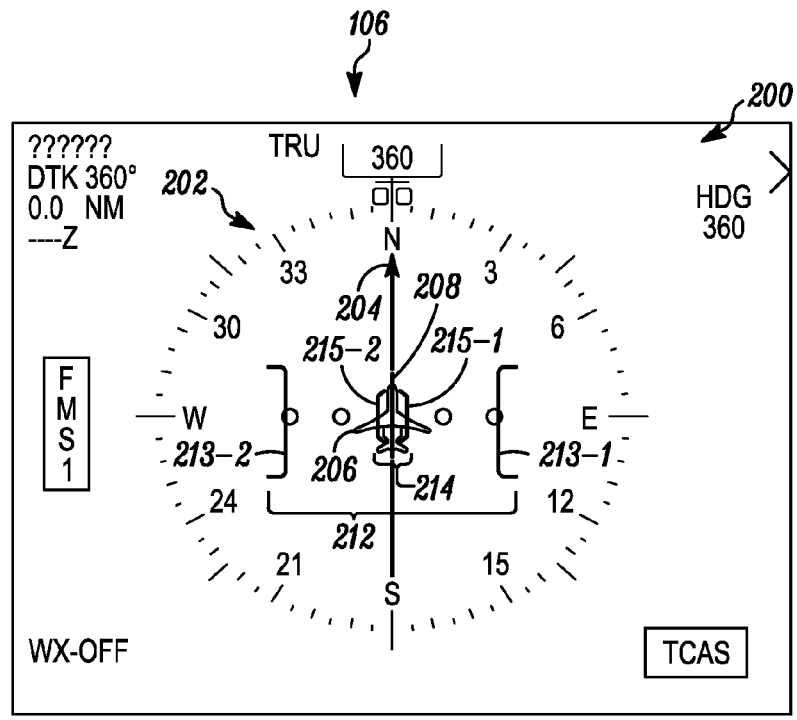
FIGS. 2-8 depict various configurations of a horizontal situation indicator that may be rendered on a display device of the display system of FIG. 1.

With reference now to FIG. 2, the horizontal situation indicator 200 includes, among other images, a compass 202, a course pointer 204, an aircraft symbol 206, a lateral deviation indicator 208, an RNP boundary graphic 212, and an EPU graphic 214. As is generally known, the compass 202 displays the aircraft's magnetic heading, the course pointer 204 displays the desired/preset course of the aircraft for the current segment of the flight plan, and the aircraft symbol 206, which is representative of a top-down view of the aircraft, displays the actual heading of the aircraft relative to the desired course. The lateral deviation indicator 208, as is also generally known, is representative of the lateral deviation of the aircraft from the desired course. In FIG. 2, the aircraft symbol 206 and lateral deviation indicator 208 are both aligned with the course pointer 204, which indicates that the aircraft is not deviating (or not significantly deviating) from the desired course.

The depicted RNP boundary graphic 212 and the depicted EPU graphic 214 are not rendered on presently known horizontal situation indicators. The RNP boundary graphic 212 is representative of at least one RNP boundary for the aircraft, and the EPU graphic is representative of the EPU for the aircraft. In FIG. 2, both RNP boundaries 213-1, 213-2 associated with the current RNP are rendered on the display. However, as will be described in more detail further below, in some instances only one of the RNP boundaries may be rendered. Whether one or both RNP boundaries are rendered, it is noted that the RNP boundary graphic 212 is rendered at a position relative to the rendered aircraft symbol 206. As noted above, the aircraft symbol 206 is rendered relative to the desired course for the current segment of the aircraft flight plan. Hence, the RNP boundary graphic 212 represents the RNP value assigned to the current segment of the aircraft flight plan. As FIG. 2 depicts, when the aircraft is not deviating from the desired course, the rendered RNP boundary graphic 212 includes both RNP boundaries 213-1, 213-2, which are rendered symmetrically on both sides of the aircraft symbol 206.

The RNP boundary graphic 212 may be rendered using numerous and varied graphics. For example, the RNP boundary graphic 212 may be rendered as a series of separated geometric figures, or as dotted lines, just to name a few. In the depicted embodiment, however, the RNP boundary graphic 212, at least when both RNP boundaries 213 are rendered, comprises a pair of line segments. One of the line segments 213-1 is rendered to the right of the aircraft symbol 206 and the other line segment 213-2 is rendered to the left of the aircraft symbol 206. In addition to the line segments, it is seen that outwardly pointing arrowheads may be included on the ends of the rendered line segments 213.

Figure 3:
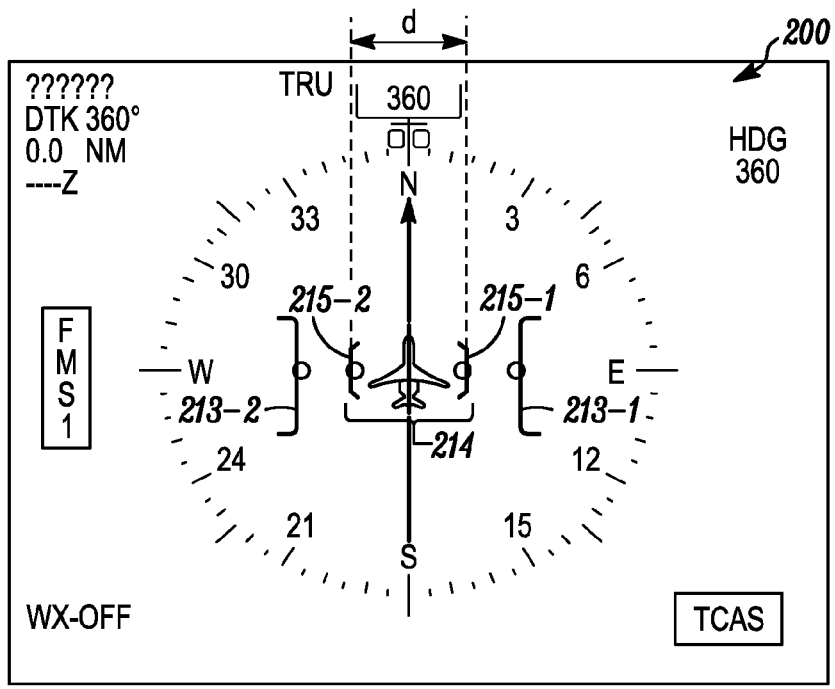

The EPU graphic 214, like the RNP boundary graphic 212, may be rendered using numerous and varied graphics. However, also like the RNP boundary graphic 212, the depicted EPU graphic 214 comprises a pair of line segments 215-1, 215-2, with one line segment 215-1 rendered to the left of the aircraft symbol 206 and the other line segment 215-2 rendered to the right of the aircraft symbol 206. Moreover, in addition to the line segments, it is seen that inwardly pointing arrowheads may be included on the ends of the rendered line segments 215. The line segments 215 that comprise the EPU graphic 214 are symmetrically disposed on either side of the aircraft symbol 206, and are separated from each other by a separation distance (d) (see FIG. 3) that is proportional to the EPU for the aircraft. That is, the greater the separation distance (d), the greater the uncertainty of the aircraft's position. It may thus be appreciated that the horizontal situation indicator 200 that is depicted in FIG. 2 is displayed an aircraft with a relatively strong EPU. Conversely, if the horizontal situation indicator 200 is displayed in an aircraft with a relatively weak EPU, then the EPU graphic 214 will be rendered with a greater separation distance, such as the EPU graphic 214 that is depicted in FIG. 3.

Figure 4:
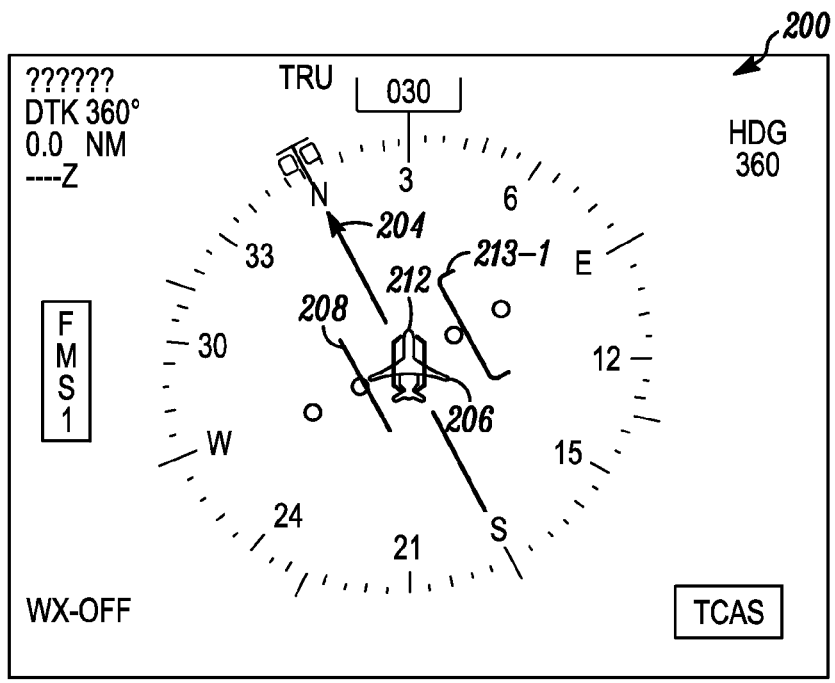

It was noted above that the RNP boundary graphic 212 is rendered at a position relative to the aircraft symbol 206. It was additionally noted that in some instances only one of the RNP boundaries 213 may be rendered. Illustrative examples of these features are depicted in FIGS. 4-7. Referring first to FIG. 4, the rendered horizontal situation indicator 200 is for a situation in which the aircraft is experiencing a right lateral deviation. In particular, the aircraft is deviating to the right of the desired course in the current flight plan, and is approaching the right RNP boundary 213-1. As such, the course pointer 204 is pointing to the left of the aircraft symbol 206, and the course deviation indicator 208 is disposed to the left of the aircraft symbol 206 and the course pointer 204. Moreover, the RNP boundary graphic 212 comprises only the right RNP boundary 213-1, which is rendered closer to the aircraft symbol 206 than it was in FIGS. 2 and 3.

Figure 5:
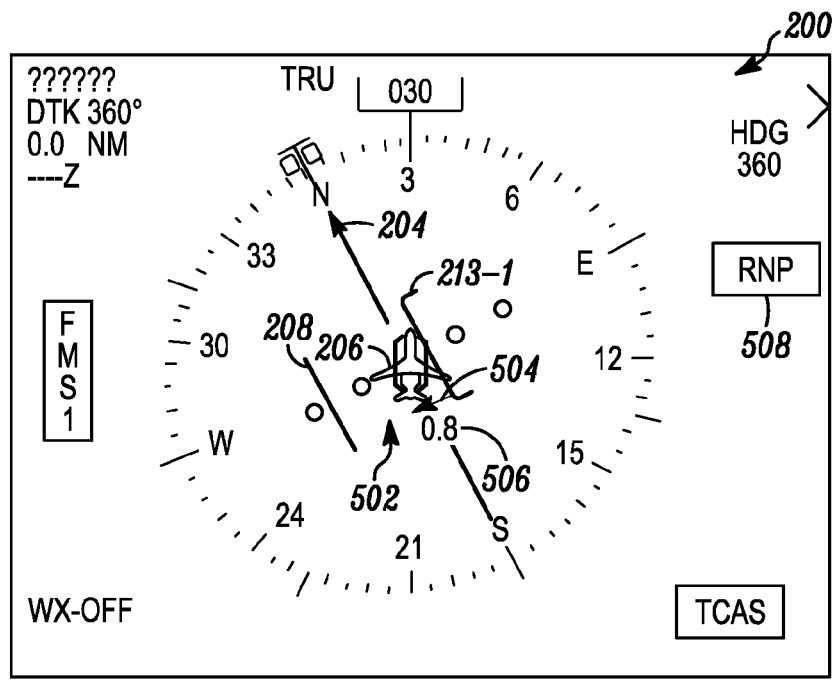

If the aircraft were to continue on its course and further increase the right lateral deviation, when a first predetermined lateral deviation distance is reached, as determined by the processor 102, the rendered horizontal situation indicator 200 changes. In particular, as FIG. 5 depicts not only is the right RNP boundary 213-1 rendered even closer to the aircraft symbol 206, it is preferably rendered in a different color than it was in FIGS. 2-4. It will be appreciated that the color in which the RNP boundary graphic 212 is displayed may vary discretely or continuously with the lateral deviation of the aircraft. Moreover, it is seen that the processor 102, at least in the depicted embodiment, also renders additional graphics on the display device 106. One graphic, which is referred to herein as a corrective graphic 502, includes a graphic representative of a corrective direction 504 and a graphic indicating the lateral deviation distance 506. In the example depicted in FIG. 5 the aircraft is deviating to the right, about 0.8 nautical miles (NM) from the desired course, and is very near the right RNP boundary 213-1. As a result, the corrective graphic 502 includes an arrow 504 pointing to the left and a number (e.g., 0.8) 506 indicating the lateral deviation distance. The other graphic, which is referred to herein as an RNP annunciator graphic 508, is preferably rendered simultaneously with the corrective graphic 502.

Figure 6:
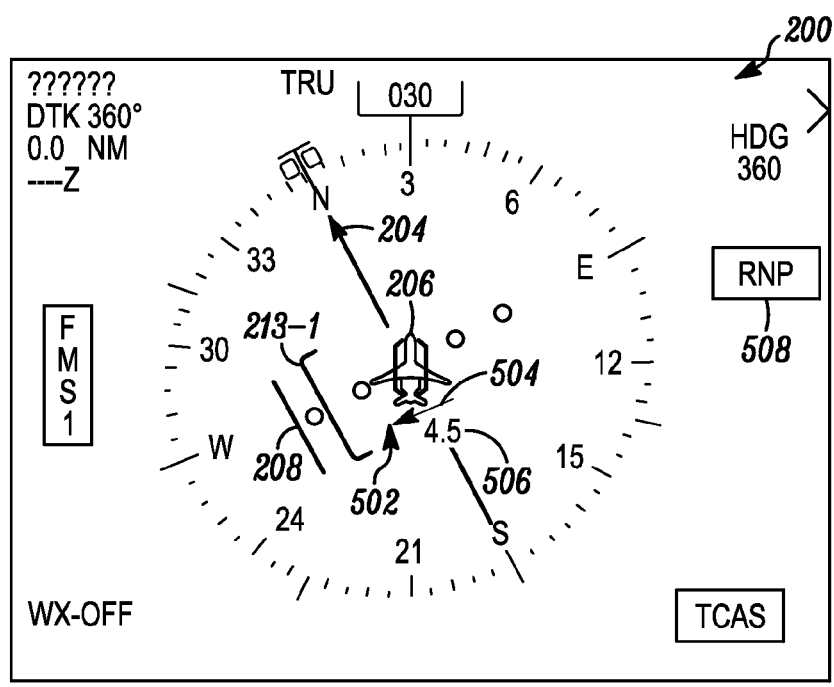
Figure 7:
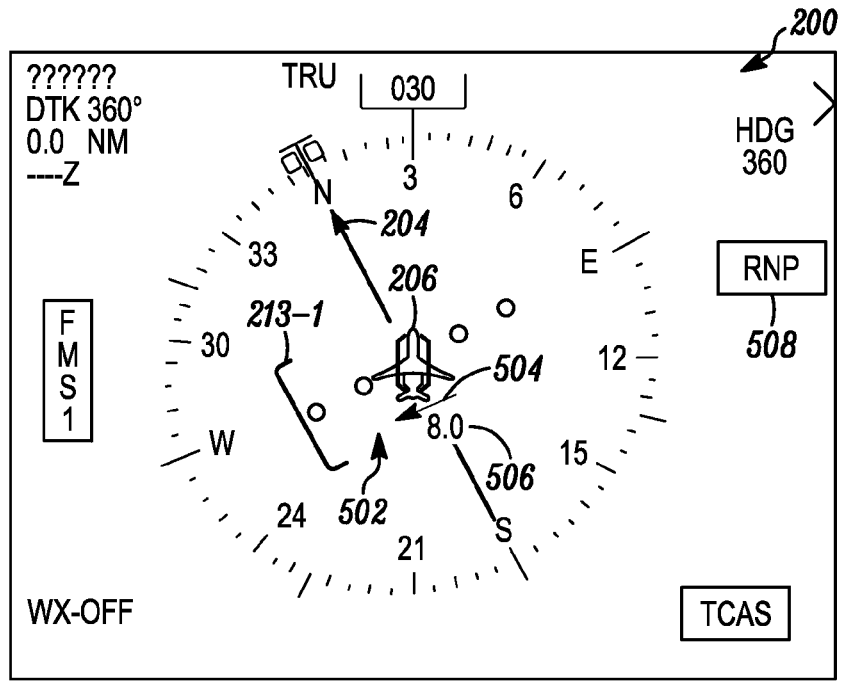

Turning now to FIGS. 6 and 7, the situation is illustrated for the case in the right lateral deviation is increased even further, so that the aircraft travels completely outside of the RNP corridor. When this occurs, as determined by the processor 102, the lateral deviation indicator 206 is rendered at a predetermined position, while the right RNP boundary 213-1 continues to be rendered in the same color as it was in FIG. 5, and while the corrective graphic 502 continues to be rendered. The position at which the lateral deviation indicator 206 is rendered when the aircraft leaves the RNP corridor may vary. However, in the depicted embodiment the lateral deviation indicator 206 is rendered at an extreme left-most position within the circumference of the rendered compass 202. It will be appreciated, of course, that if the aircraft were to travel outside of the RNP corridor to the left, that the lateral deviation indicator 206 would be rendered at an extreme right-most position within the circumference of the rendered compass 202.

As FIG. 7 depicts, if the right lateral deviation is increased still further, at some other predetermined distance the right RNP boundary 213-1 will be rendered, in the same color as it was in FIGS. 5 and 6, at the same position as the lateral deviation indicator 208. The right RNP boundary 213-1 will, however, overlap the lateral deviation indicator 208 and, at least in the depicted embodiment, obscures the lateral deviation indicator 208. As with the situations illustrated in FIGS. 5 and 6, the corrective graphic 502 continues to be rendered as well. It is noted that the display system is preferably configured such that any movement of the movement of the lateral deviation indicator 208, the RNP boundary graphic 212, and/or the EPU boundary graphic 214 is conducted in a smooth manner, and any repositioning of the rendered graphics is smoothly driven to the new location. Thus, there are preferably no abrupt jumps in the positions of the rendered graphics.

Figure 8:
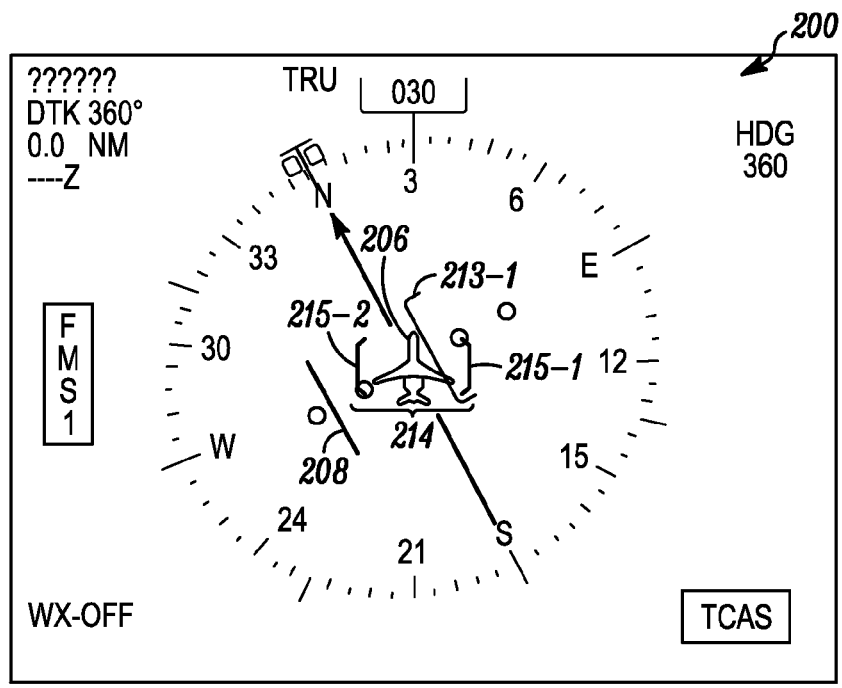

The inventive concepts described above not only provide a fairly intuitive graphic representation of RNP boundaries and the aircraft EPU on the horizontal situation indicator, these concepts may also indicate positional ambiguity to an aircraft flight crew. For example, if the current EPU for the aircraft is relatively weak, and the aircraft is approaching one of the RNP boundaries, the horizontal situation indicator 200 rendered on the display device 106 by the processor 102 may resemble FIG. 8. The depicted horizontal situation indicator 200 shows the aircraft approaching the right RNP boundary 213-1. Moreover, because the EPU is relatively weak, the separation distance (d) between the lines segments 215 of the EPU graphic 214 is relatively large, and the right line segment 215-1 is rendered to the right of the right RNP boundary 213-1. This clearly represents an ambiguity in the location of the aircraft, in that the aircraft could actually be outside of the RNP corridor.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft display system, comprising:
   a display device; and
   a processor in operable communication with the display device and adapted to receive at least data representative of a desired course of the aircraft, data representative of required navigation performance (RNP) for the aircraft, and data representative of estimated position uncertainty (EPU) for the aircraft, the processor configured, in response to at least these data, to determine a lateral deviation distance of the aircraft from the desired course, and render a horizontal situation indicator on the display device that includes:
   (i) an aircraft symbol representative of a top-down view of the aircraft, the aircraft symbol rendered at a position that is representative of actual aircraft position relative to the desired course,
   (ii) an RNP boundary graphic representative of at least one RNP boundary for the aircraft, the RNP boundary graphic rendered at a position relative to the rendered aircraft symbol,
   (iii) an EPU graphic representative of the EPU for the aircraft, the EPU graphic comprising a pair of line segments symmetrically disposed on either side of rendered aircraft symbol and separated from each other by a separation distance that is proportional to the EPU for the aircraft, one line segment always rendered left of the rendered aircraft symbol, and another line segment always rendered right of the rendered aircraft symbol,
   (iv) a lateral deviation indicator representative of the determined lateral deviation distance, the lateral deviation indicator separated from the aircraft symbol by a distance representative of the determined lateral deviation distance, and
   (iv) a corrective graphic if the lateral deviation distance is greater than a first predetermined lateral deviation distance, the corrective graphic comprising a graphic representative of a corrective direction and a graphic numerically indicating the lateral deviation distance.

2. The system of claim 1, wherein the RNP boundary graphic is at least selectively representative of each RNP boundary for the aircraft.

3. The system of claim 2, wherein the RNP boundary graphic at least selectively comprises a pair of line segments.

4. The system of claim 3, wherein:
   one line segment is rendered left of the aircraft symbol; and
   another line segment rendered right of the aircraft symbol.

5. The system of claim 1, wherein the processor is further configured to:
   render the RNP boundary graphic in a first color when the lateral deviation distance is not greater than the first predetermined lateral deviation distance; and
   render at least a portion of the RNP boundary graphic is a second color when the lateral deviation distance is greater than the first predetermined lateral deviation distance.

6. The system of claim 1, wherein the processor further configured to render a lateral deviation indicator on the display device.

7. The system of claim 6, wherein the processor is further configured to render the lateral deviation indicator at a predetermined position on the display device if the lateral deviation distance is greater than a second predetermined lateral deviation distance.

8. The system of claim 7, wherein the processor is further configured to render at least a portion of the RNP boundary graphic at the predetermined position if the lateral deviation distance is greater than a third predetermined lateral deviation distance.

* * * * *